(12) United States Patent
Ohkado (10) Patent No.: US 8,548,916 B2
(45) Date of Patent: Oct. 1, 2013

(54) MANAGING PASSWORDS USED WHEN DETECTING INFORMATION ON CONFIGURATION ITEMS DISPOSED ON A NETWORK

(75) Inventor: Akira Ohkado, Kanaga (JP)

(73) Assignee: International Business Machines Corporation, Armonk, NY (US)

( * ) Notice: Subject to any disclaimer, the term of this patent is extended or adjusted under 35 U.S.C. 154(b) by 699 days.

(21) Appl. No.: 12/463,912

(22) Filed: May 11, 2009

(65) Prior Publication Data

US 2009/0287936 A1 Nov. 19, 2009

(30) Foreign Application Priority Data

May 15, 2008 (JP) .................................. 2008-128682

(51) Int. Cl.
*G06Q 99/00* (2006.01)
(52) U.S. Cl.
USPC .............................................. 705/50; 726/28
(58) Field of Classification Search
USPC .............................................. 705/50; 726/28
See application file for complete search history.

(56) References Cited

U.S. PATENT DOCUMENTS

| | | | | |
|---|---|---|---|---|
| 6,064,736 A * | 5/2000 | Davis et al. | .................... | 713/155 |
| 7,650,632 B2 * | 1/2010 | Yantzi | ................................ | 726/6 |
| 7,716,722 B2 * | 5/2010 | Swift et al. | ......................... | 726/3 |
| 2002/0178366 A1 * | 11/2002 | Ofir | ................................ | 713/182 |
| 2003/0004875 A1 * | 1/2003 | Kramer et al. | .................. | 705/40 |
| 2005/0005132 A1 * | 1/2005 | Yantzi | ............................ | 713/184 |
| 2006/0225132 A1 * | 10/2006 | Swift et al. | ....................... | 726/11 |
| 2012/0144466 A1 | 6/2012 | Ohkado | | |

FOREIGN PATENT DOCUMENTS

| | | | |
|---|---|---|---|
| EP | 2320375 A1 * | 5/2011 | |
| JP | 05173972 A | 7/1993 | |
| JP | 2003122650 A | 4/2003 | |
| JP | 2004247984 A | 9/2004 | |
| JP | 2007096586 A | 4/2007 | |
| JP | 2007189735 A | 7/2007 | |
| WO | 2007115940 A1 | 10/2007 | |

OTHER PUBLICATIONS

Nishimura et al., "LESSO: Legacy Enabling SSO", IEEE Computer Society, Apr. 2008, 4 pages. (pp. 301-304).*
Deployment Guide Series: IBM Tivoli Change and Configuration Management Database Configuration Discovery and Tracking v1.1, IBM, Nov. 2006, 548 pages.*
Configuration Discovery and Tracking Terminology, IBM Redbooks Deployment Guide Series: IBM Tivoli Change and Configuration Management Database v1.1, IBM Corp. 2006, (24 pgs).
Ling Tai et al., IBM Tivoli Common Data Model: Guide to Best Practices, IBM Redpaper, IBM Corp. 2008, (7 pgs).
Japanese Office Action, Application No. 2008-128682, Feb. 7, 2013, 4 pages.

* cited by examiner

*Primary Examiner* — James D Nigh
(74) *Attorney, Agent, or Firm* — Toler Law Group, PC (57) ABSTRACT

Disclosed embodiments include a computer system for receiving an encrypted password from an ID management system. The computer system sends the encrypted password to a decryption system, where the decryption system decrypts the encrypted password. The decrypted password is then transmitted to the computer system, and the computer system transfers the decrypted password to a configuration item disposed on a network. Based on the password, the configuration item sends data concerning the configuration item to the computer system.

20 Claims, 9 Drawing Sheets

MANAGING PASSWORDS USED WHEN DETECTING INFORMATION ON CONFIGURATION ITEMS DISPOSED ON A NETWORK

I. RELATED APPLICATIONS

The present application claims priority from Japanese patent application number 2008-128682 filed on May 15, 2008 and entitled "COMPUTER SYSTEM, METHOD, AND COMPUTER PROGRAM FOR MANAGING PASSWORDS USED WHEN DETECTING INFORMATION ON CONFIGURATION ITEMS DISPOSED ON NETWORK."

II. FIELD

The present disclosure relates to a computer system, a method, and a computer program for managing passwords used when detecting information on configuration items disposed on a network.

III. BACKGROUND

The information technology infrastructure library (ITIL) (trademark of the British Government) is a collection of best practices (best examples) for realizing information technology (IT) service management. At a center of the ITIL is service support and service delivery. One of the services supported is configuration management. Configuration management refers to a process for identifying a configuration item (CI) that is a subject of IT service management and for maintaining, confirming, and inspecting information on the configuration item. Configuration items include not only system resources, such as hardware, software, and databases, but also equipment necessary to provide IT services, manuals on IT service management, documents such as work procedure manuals and block diagrams, services on maintenance information, processes, and human resources.

In the framework of the ITIL, it is recommended that configuration items be managed in a unified way using a database called a configuration management database (CMDB). The CMDB is a database for recording at least one attribute of each configuration item and relationships between each configuration item and other configuration items. If a computer system is provided with a CMDB, as well as an ability to automatically find information on configuration items (discovery) and an ability to automatically update information on configuration items (tracking), the computer system is enabled to reflect information on the configuration items at the CMDB.

International Business Machines Corporation (IBM) provides the "Tivoli Change and Configuration Management Database" (Tivoli CCMDB) as software to help construct a CMDB and to control operation processes on the basis of the constructed CMDB. The Tivoli CCMDB includes operation management software for performing discovery and tracking.

The Tivoli CCMDB is enabled to identify 300 types of configuration items in a distributed network environment, such as a server, clients, an operating system (OS), middleware (e.g., Web/Application Program/Database Management System/Lightweight Directory Access Protocol, etc.), package software, management tools, network devices, and storage devices. The Tivoli CCMDB is also enabled to automatically find and update information on the configuration items, such as information on the configurations of computers such servers and clients, information on applications that run on each computer, information on the configurations of network attached storage (NAS) printers, and information on the configurations of storage area network (SAN) printers, and similar devices connected to a network.

Although the method for collecting information on a configuration item depends on the configuration item to be managed, a computer system that manages a CMDB accesses a remote interface for management periodically using Secure SHell (ssh), Simple Network Management Protocol (SNMP), Windows Management Instrumentation (WMI), or other protocol to read a setting file on the Operating System (OS), to read configuration information, or to execute a command to display settings.

Note that there is no need to install an agent program into the configuration item to be managed. In order to collect information on a configuration item and relationships between the configuration item and other configuration items without installing an agent program into the configuration item, the Tivoli Application Dependency Discovery Manager (TADDM) may be used. The TADDM is a component of the CCMDB. As of the year 2006, information found and updated in the above-described manner is categorized into 31 sections (categories such as computer system, database, application, and process), 636 classes (basic unit of data model; each class belongs to one or more sections), 2609 attributes (information on an attribute of data; each attribute belongs to one class), 7 interfaces (a group of attributes that are frequently used; each interface belongs to multiple sections), 57 relationships, and 49 data types on the basis of the "Common Data Model" (CDM). The CDM is a data model for use in a configuration management database set forth by IBM. Information on a configuration item and relationships between the configuration item and other configuration items is passed on to a graphical user interface (GUI) display tool such as a TADDM console. The configuration item and relationships between the configuration item and other configuration items are visually displayed on a display unit using individual blocks and links between the blocks.

In order to collect information on configuration items, a configuration information collection system for performing discovery requires the user IDs and passwords of administrators that have the authority to administer the respective configuration items. However, much effort is required for the configuration information collection system to manage the passwords concerning all the configuration items. Also, if the password concerning a configuration item to be managed changes, the configuration information collection system requires the changed password to collect information on the configuration item. Again, much effort is needed for the configuration information collection system to manage the changed password in synchronization. Further, if the CMDB stores the user IDs and passwords concerning all the configurations items, the security of the configuration information collection system must be made more stringent. Also, if the security is made more stringent, the use of information on the configuration items stored in the CMDB may need to be restricted.

IV. SUMMARY

A particular embodiment provides a computer system that includes a repository to store a set of data. The set of data is created according to detected information regarding a configuration item. The set of data identifies at least one attribute of the configuration item and a relationship between the configuration item and another configuration item. The set of data is accessible by use of an identity (ID) and a password associated with the configuration item. The computer system also includes a first reception unit to receive an encrypted password from an ID management system. The computer system further includes a transmission unit to transmit the encrypted password to a decryption system that has access to a decryption key corresponding to an encryption key related to the encrypted password. The computer system includes a second reception unit to receive a decrypted password from the decryption system. The decrypted password is usable to access the set of data and the decrypted password is removed after the set of data is accessed.

Another illustrative embodiment is a method that includes receiving a password in an encrypted state from an ID management system where the password provides access to a set of data. The set of data includes detected information regarding a configuration item. The method also includes transmitting the password in the encrypted state to a decryption system. The decryption system is operable to decrypt the password in the encrypted state using a decryption key. The decryption key corresponds to an encryption key of the password. The method further includes receiving a decrypted password from the decryption system, where the decrypted password is usable to access the set of data. The method includes removing the decrypted password after use of the decrypted password to obtain access to the set of data.

Another illustrative embodiment is a computer system for managing a password used for detecting information on a configuration item disposed on a network. The computer system is connectable to a repository storing a set of data created according to the detected information on the configuration item. The set of data indicates at least one predetermined attribute of the configuration item and a relationship between the configuration item and another configuration item. The computer system uses an ID and a password in order to detect the information on the configuration item. The computer system includes a first reception unit for receiving the password in an encrypted state from an ID management system. The ID management system is connectable to the computer system and manages the ID. The computer system also includes a transmission unit for transmitting the encrypted password to a decryption system. The decryption system is connectable to the computer system for decrypting the encrypted password. The decryption system also has a decryption key corresponding to an encryption key used to encrypt the password. The computer system also includes a second reception unit for receiving a decrypted password from the decryption system. The decrypted password is used to detect information on a particular configuration item and is removed from the computer system after use so that the decrypted password is not leaked.

Another illustrative embodiment is directed to a method for managing a password used when a computer system detects information on a configuration item disposed on a network. The computer system is connectable to a repository storing a set of data created according to the detected information on the configuration item. The set of data indicates at least one predetermined attribute of the configuration item and a relationship between the configuration item and another configuration item. The computer system uses an ID and a password in order to detect the information on the configuration item. The method includes receiving the password in an encrypted state from an ID management system. The method also includes transmitting the encrypted password to a decryption system. The method further includes decrypting the encrypted password using a decryption key corresponding to an encryption key of the password. The method also includes receiving a decrypted password from the decryption system. The decrypted password is used to detect information on a particular configuration item. The method also includes removing the decrypted password from the computer system after use so that the decrypted password is not leaked.

According to some embodiments, the passwords concerning the configuration items are encrypted in the configuration information collection system except during a temporary period during which the decrypted password is received from the decryption system. Also, the decryption key may not exist in the configuration information collection system. As a result, the security management of the configuration information collection system need not be made as stringent as when the passwords are stored in their decrypted state.

VI. DETAILED DESCRIPTION

Before describing particular embodiments, basic terms relating to a configuration management database (CMDB) are described.

Configuration Items (CI): A CI is a basic unit of a subject of IT service management. CIs include system resources such as hardware and software, equipment necessary to provide IT services, manuals on IT service management, documents such as work procedure manuals, and block diagrams, services on maintenance information, processes, and human resources. Configuration items are items disposed on a network.

Configuration Management Database (CMDB): A CMDB is a database for recording at least one attribute of each CI and relationships between each CI and other CIs. A CMDB is a centerpiece of configuration management of the ITIL framework. A CMDB is a database and may take the form of a database system with spreadsheet software. Use of a CMDB allows an administrator to easily understand relationships between CIs.

Configuration Item Instance (CI instance): A CI instance is data corresponding to a CI. Each CI instance is represented as an instance of a data model in a CMDB. An example of an instance is an instance of static data or an instance of a Java class. A Java class instance is stored in a CMDB using a mechanism for perpetuating Java class instances to store the instances. One example of such a mechanism is known as Java Data Objects (JDO). Even if the computer system is temporarily turned off, created Java class instances are not lost. Subsequently, when the power is turned on, the Java class instances are read from a storage unit such as a hard disk and loaded into a main memory and become Java class instances that are changeable or deletable using a Java program. In the following description, it may be assumed that CIs are stored as instances in a CMDB.

Data Models: A data model is a schema for defining a CI and is an information model for providing a consistent definition of a CI to be managed and relationships between the CI and other CIs. Specifically, a data model defines a predetermined attribute of a CI and relationships between the CI and other CIs (manufacturing apparatuses, processes, etc.). Among examples of a data model is the "CDM" that is a data model for a configuration management database set forth by IBM. For example, the CDM may be implemented according to the Unified Modeling Language (UML).

Attributes: If a CI is managed, an attribute of the CI identifies and describes the CI. The attributes include the following: the name of a CI (a general name of a CI, e.g., a server, a client, a firewall), a product number (ID) (a number for identifying a particular substance of a CI, such as a production number or a serial number), a category (category of a CI, such as hardware, software, or document), a type (description of a CI more detailed than the category), a model number (model number of a CI named by a provider), a warranty period (warranty period of a CI set by a provider), a version number (version number of a CI), a location (location where a CI exists, such as a place where a personal computer (PC) is installed, a library of software, a storage medium, or a site where services are provided), an owner (name of the manager of a CI), a management start date (date when the owner of a CI becomes the manager of the CI), a provider (developer or provider of a CI), a license (license number, the number of licenses), a provision date (date when a CI is provided to an organization), an acceptance date (date when a CI is accepted by an organization), a use start date (date when use of a CI is started), a status of a CI (current status, e.g., in operation, under test, out of order, or a future status such as a scheduled status of a CI), and a status of a CI instance (a CI instance is enabled/disabled or active/inactive). Attributes are not limited to the above-described attributes.

Relationship: A relationship represents a relationship between CIs. Like a CI, a relationship may be defined by a data model. Among examples of a relationship are assigns, canConnect, canUse, connectAt, connects, controls, deployedOn, Located, Managed, Owned, provides, runAt, uses, and usedBy.

Transaction Dependence Relationships: A transaction dependence relationship is a type of a CI relationship that exists when a transaction exists between two applications.

Figure 1A:
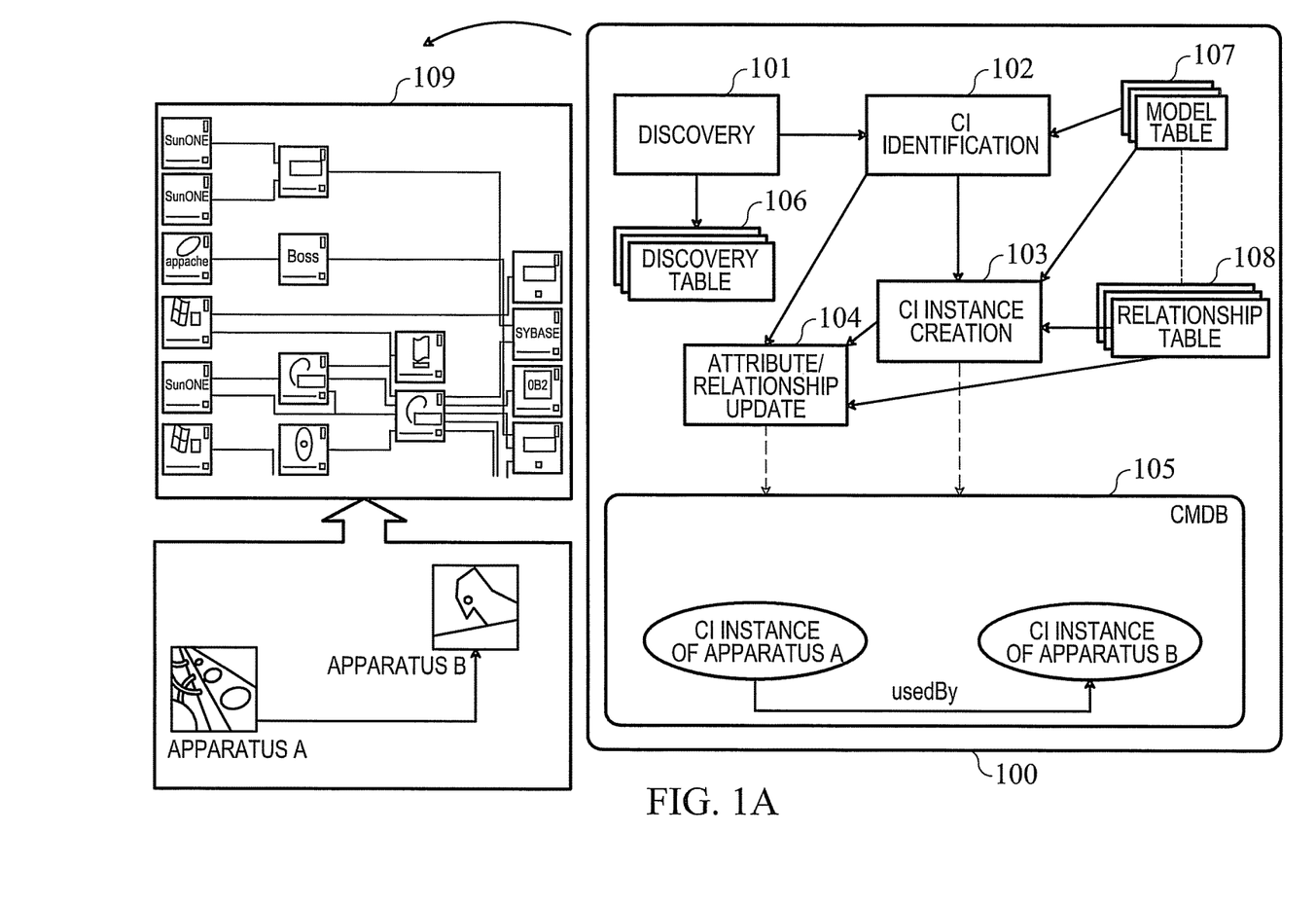
FIG. 1A depicts an example of a computer system that manages configuration items, such as apparatuses A and B, and includes a CMDB.

FIG. 1A is an example of a computer system 100 that manages CIs (e.g., apparatuses A and B) and includes a CMDB 105. The computer system 100 includes a discovery unit 101, a CI reconciliation unit 102, a CI instance creation unit 103, an attribute/relationship update unit 104, and the CMDB 105. The discovery unit 101, CI reconciliation unit 102, CI instance creation unit 103, attribute/relationship update unit 104, and CMDB 105 may be implemented in a single computer or may be implemented in multiple computers in a distributed manner. The computer system 100 also includes a discovery table 106, a model table 107, and a relationship table 108. These tables may be implemented in a storage unit of a single computer or may be implemented in storage units of multiple computers in a distributed manner.

FIG. 1A also shows an example of a screen 109 of a console of a TADDM. The screen 109 shows CIs and connection relationships between the CIs. The CIs and relationships between the CIs are illustrative only and do not show all CIs to be managed by the computer system 100 or all connection relationships between the CIs.

The discovery unit 101 detects or discovers information on CIs to be managed by the CMDB 105. The computer system 100 may include multiple discovery units 101. CIs to be managed are preferably connected to the computer system 100 via a network. The network may be either a wire-connected network or a wirelessly connected network. An administrator of the computer system 100 may arbitrarily specify CIs to be detected. A detection range may be specified, for example, using a domain name, an Internet protocol (IP) address, a media access control (MAC) address, an identifier of an apparatus, the name of a database, or combinations thereof. If a CI to be managed is, for example, an industrial apparatus, information on the industrial apparatus is detected.

The detected information may include information on a new CI, value(s) indicating an updated attribute of an existing CI or updated relationships between the existing CI and other CIs. A new CI refers to a CI that has been detected by the discovery unit 101 but is yet to be registered in the CMDB 105. An existing CI refers to a CI, an instance of which is already registered in the CMDB 105. The discovery unit 101 detects information on a CI according to discovery information stored in the discovery table 106. What discovery information should be used is specified by a discovery method in a data model (201 in FIG. 2B). The discovery unit 101 passes the detected CI information on to the CI reconciliation unit 102.

The CI reconciliation unit 102 receives the above-described CI information from the discovery unit 101 and processes the detection result. Then, the CI reconciliation unit 102 determines whether the CI information is information on a new CI or value(s) indicating an updated attribute of an existing CI, or updated relationships between the existing CI and other CIs, with reference to the CMDB 105. For example, the CI reconciliation unit 102 makes the determination by comparing the name of an instance of a CI stored in the CMDB with the CI information. If the CI information is information on a new CI, the CI reconciliation unit 102 passes the information on to the CI instance creation unit 103. On the other hand, if the CI information is value(s) indicating an updated attribute of an existing CI or an updated relationship between the existing CI and other CIs, the CI reconciliation unit 102 passes the information on to the attribute/relationship update unit 104.

The CI instance creation unit 103 creates, from the detected CI information, a set of data indicating a predetermined attribute of the CI and relationships between the CI and other CIs according to a data model (201 in FIG. 2B) stored in the model table 107 and a relationship model (204 in FIG. 2B) stored in the relationship table 108. The set of data is converted into an instance according to the information on the CI detected by the discovery unit 101 or information on the CI that is input manually (see FIG. 2A).

For example, the set of data is converted into an instance of static data or a Java class instance. An example of a set of data is a CI instance. FIG. 2B shows an example of a CI instance 203. The above-described set of data is stored in the CMDB 105. An attribute and relationships included in the set of data may both be included in the CI instance (see 203), or the attribute may be included in the CI instance and the relationships may be stored as a relationship instance separate from the CI instance in the CMDB 105. In the latter case, the CI instance has a link for identifying the related relationship instance.

The attribute/relationship update unit 104 performs tracking together with the discovery unit 101. The attribute/relationship update unit 104 reflects value(s) indicating an updated attribute of a CI or updated relationships between the CI and other CIs on a CI instance of the CI stored in the CMDB 105. That is, the attribute/relationship update unit 104 updates the value(s) of the attribute or relationships in the CI instance of the CI. The update is performed by replacing the value(s) with the information on the CI detected by the discovery unit 101. The replacement may be performed by replacing all the values of attributes and relationships in the CI instance with the information on the CI detected by the discovery unit 101 or by replacing only values that are different from the information on the CI detected by the discovery unit 101. The CMDB 105 also stores a CI instance (203 in FIG. 2B) of a CI.

The discovery table 106 stores discovery information (202 in FIG. 2B). The discovery information is used when the discovery unit 101 detects information on a CI. For example, the discovery information (202 in FIG. 2B) may be stored as an instance of static data or a Java class instance. The discovery information is also called a discovery policy. The discovery information (202 in FIG. 2B) includes the range that the discovery unit 101 searches, that is, a collection target (scope) that is the range within which a CI is searched for, an attribute to be collected, and a relationship to be collected (202 in FIG. 2B). The collection target is specified, for example, using a subnet IP address, the range of an IP address, individual IP addresses, a MAC address, an identifier of an apparatus, a host name, the name of a database, or combinations thereof.

In another embodiment, the collection target may be a schedule management database (not shown) connected to the computer system 100 via a network. For example, the schedule management database stores data on the management of a process in which an apparatus is used. In another embodiment, the collection target may be a database (not shown) storing a batch processing definition file. In this case, the discovery unit 101 performs detection by reading the contents of the batch processing definition file. For example, the batch processing definition file stores data concerning an order in which apparatuses should be used.

The model table 107 stores a data model (201 in FIG. 2B). The data model is used when the CI instance creation unit 103 creates a set of data indicating a predetermined attribute of the CI and relationships between the CI and other CIs.

The relationship table 108 stores a relationship model (204 in FIG. 2B). The relationship model is used when the CI instance creation unit 103 creates a set of data indicating a predetermined attribute of the CI and relationships between the CI and other CIs.

FIG. 1A shows a state in which the discovery unit 101 is detecting information on an apparatus that is connected to the computer system 100 via a network and is a subject of management. As a result, the discovery unit 101 detects information on an apparatus A and an apparatus B that is using the apparatus A. Subsequently, the CI reconciliation unit 102 determines whether the information is about a new CI with reference to the CMDB 105. Based on the determination, the CI instance creation unit 103 creates a CI instance of the apparatus A, a CI instance of the apparatus B, and an instance of a relationship (e.g., usedBy) between these apparatuses. Then, these instances are stored in the CMDB 105.

Figure 1B:
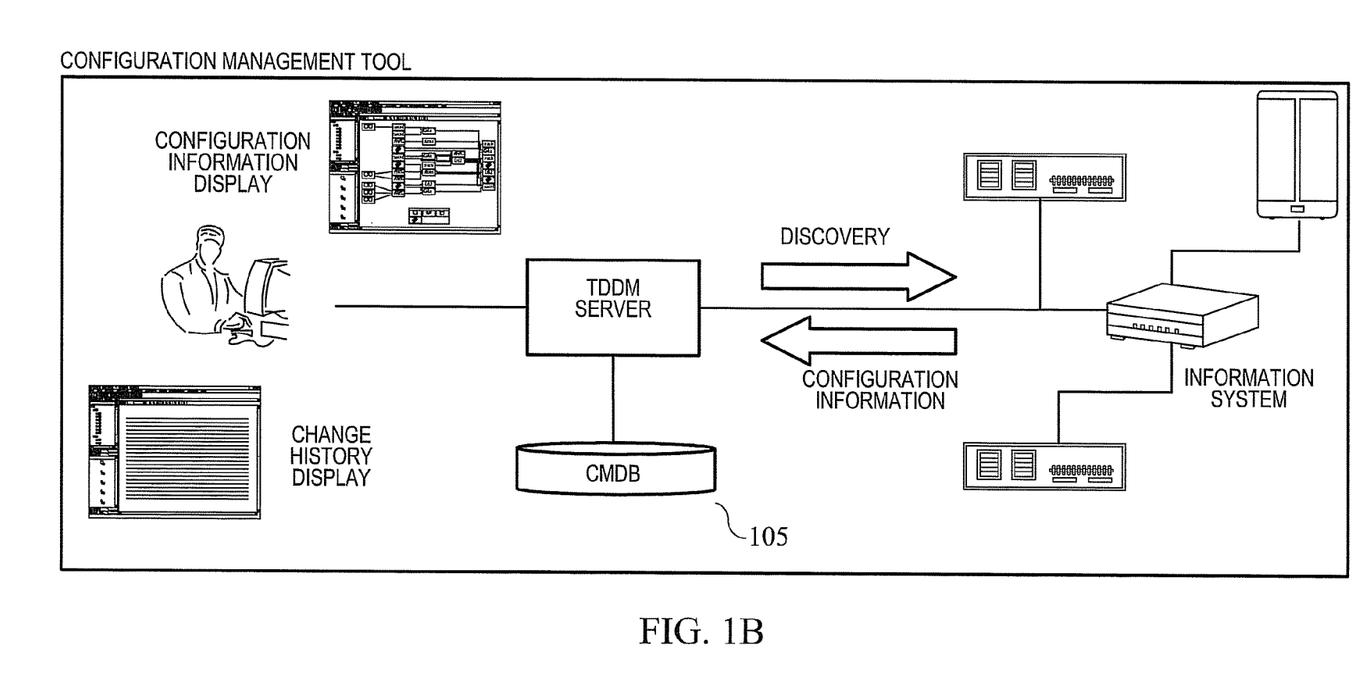
FIG. 1B shows a configuration management tool.

FIG. 1B shows a configuration management tool. The configuration management tool has a function (discovery) of automatically collecting information on a configuration item (configuration information), a function (topology) of graphically displaying configuration information, and a function (analytics) of analyzing a change history and comparing configurations. For example, the TADDM server acquires configuration information on an information system using ssh, SNMP, WMI, or some other protocol. For example, the configuration information is a type or configuration of the operating system of the information system or a type or configuration value of an application of the information system. The TADDM server stores the acquired information as a CI instance in the CMDB. Then, the TADDM server transmits the configuration information and change history information to a computer of the administrator according to the CI instance stored in the CMDB. The computer of the administrator displays the configuration information and history information.

Figure 2A:
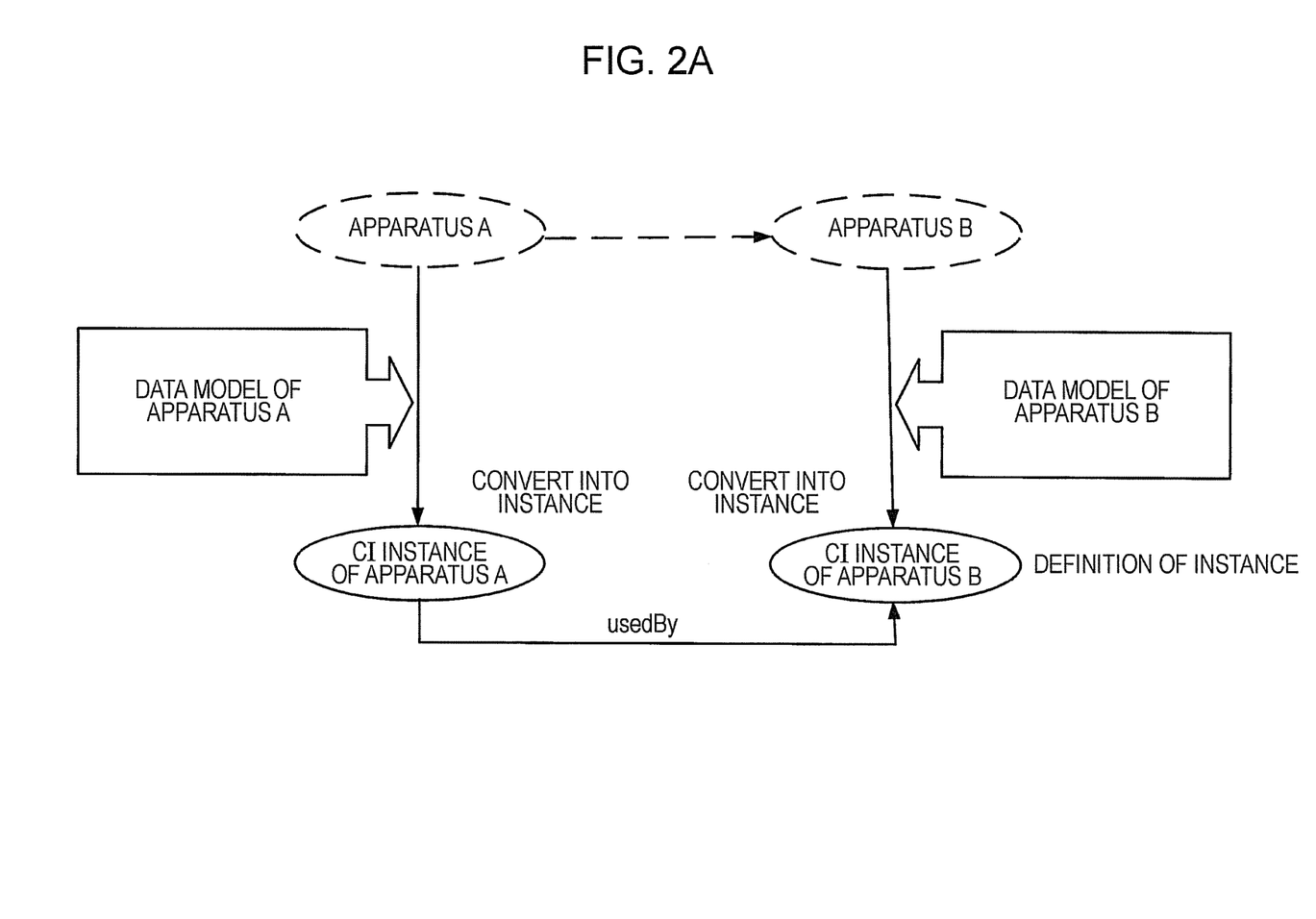
FIG. 2A shows creation of CI instances, for example, CI instances of apparatuses A and B and an instance of a relationship (usedBy) between A and B.
Figure 2B:
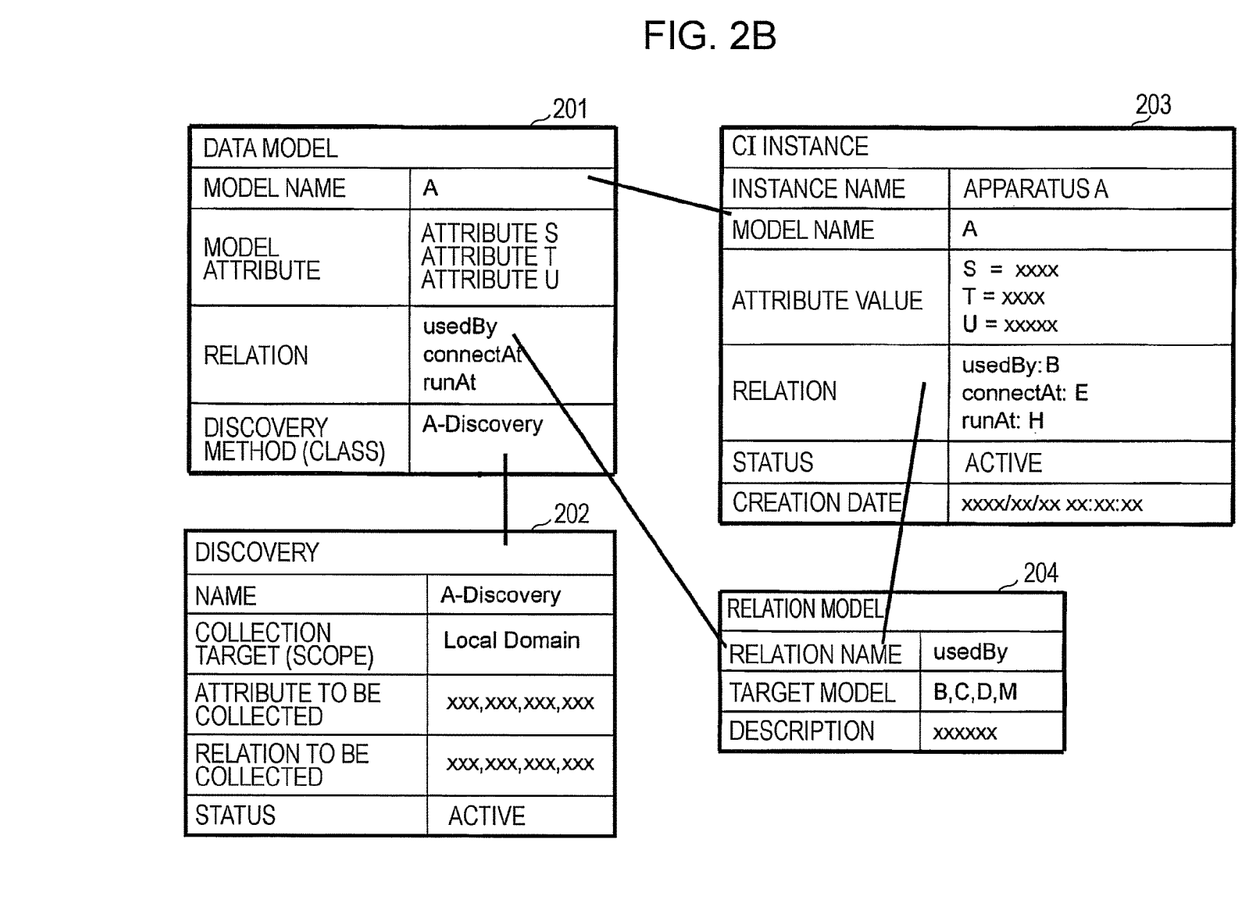
FIG. 2B shows a data model stored in a model table, a discovery instance stored in a discovery table, a CI instance of the apparatus A stored in a CMDB, and a relationship model stored in a relationship table.

FIG. 2A shows creation of instances of CIs (e.g., apparatuses A and B) and an instance of a relationship (usedBy) between these apparatuses. The CI instance of the apparatus A is created from information on the apparatus A detected by the discovery unit 101 using a data model of the apparatus A by the CI instance creation unit 103. Similarly, the CI instance of the apparatus B is created from information on the apparatus B detected by the discovery unit 101 using a data model of the apparatus B by the CI instance creation unit 103. The respective data models of the apparatuses A and B are stored in the model table (107 in FIG. 1A). An instance of a relationship between CIs, that is, an instance of a relationship (usedBy) between the apparatuses A and B, is created from the information on the apparatus A detected by the discovery unit 101 according to a relationship model by the CI instance creation unit 103. The relationship model is stored in the relationship table 108.

As described above, FIG. 2A shows that a CI instance of the apparatus B is created using a data model of the apparatus B. However, if apparatuses, the instances of which are to be created using the data model of the apparatus B, are, for example, apparatuses B1, B2, and B3, respective pieces of information on the apparatuses B1, B2, and B3 are converted into instances using the data model of the apparatus B so that the respective CI instances of the apparatuses B1, B2, and B3 are created. The CI instances of the apparatuses B1, B2, and B3 are also stored in the CMDB 105.

FIG. 2B shows a data model 201 stored in the model table (107 in FIG. 1A), a discovery instance 202 stored in the discovery table (106 in FIG. 1A), a CI instance 203 (of the apparatus A) stored in the CMDB (105 in FIG. 1A), and a relationship model 204 stored in the relationship table (108 in FIG. 1A).

The data model 201 is a schema for defining a CI. The data model 201 has respective descriptions in a "model name" field indicating the particular model of the CI, a "model attribute" field indicating an attribute of the CI specified in the model name field, a "relation" field indicating relationships that the CI specified in the model name can have with other CIs, and a "discovery method" field for specifying a discovery instance for detecting the CI specified by the model name. While model attributes are defined, for example, according to the attributes defined in the "CDM" (a data model for a configuration management database set forth by IBM), the model attributes are not limited to such attributes. The CDM defines types of attributes. The administrator of the CMDB 105 may arbitrarily specify attributes in the data model 201.

While relationships may be defined, for example, according to the relationships defined in the CDM, the relationships are not limited to such relationships. The CDM defines 57 types of relationships. The discovery method is specified using the name of the discovery instance. In FIG. 2B, the discovery method is "A-Discovery."

The discovery instance 202 has respective descriptions in a "name" field indicating a discovery instance specified using the discovery method described in the data model 201, a "collection target (scope)" field indicating a range over which the discovery unit 101 collects a CI to be managed, an "attribute to be collected" field, a "relationship to be collected" field indicating attributes and relationships, respectively, of a CI as a subject of management that are to be collected by the discovery unit 101, and a "status" field indicating whether the discovery instance is active or inactive.

The CI instance 203 has respective descriptions of an "instance name" field for specifying what CI the instance corresponds to, a "model name" field indicating the data model used when the instance has been created, an "attribute value" field indicating the values of attributes specified in the data model, a "relation" field indicating the values of relationships specified in the data model, a "status" field indicating whether the instance is active or inactive, and a "creation date" field indicating when the CI instance has been created.

Also, the CI instance preferably includes a CI instance identifier specific to the CI instance. The CI instance identifier is not limited to any particular former type as long as the CI instance is distinguishable from other CI instances. For example, the CI instance identifier may be a host name, a serial number, or a combination of other attributes that have a given value. The CI instance 203 shown in FIG. 2B indicates that the CI instance is an instance of the apparatus A; the instance has been created using the data model A; the instance has attributes S, T, and U each having a value; as to relations, the apparatus A is used by an apparatus B (usedBy: B); the apparatus A is connected to an apparatus E (connectAt: E); the apparatus A runs on an apparatus H (runat: H); the CI instance is active; and the date/times when the CI instance has been created are in the "creation date" field.

The relation model 204 is a schema for defining a relationship specified in the data model 201. The relation model 204 has respective descriptions of a "relation name" field indicating the name of a relation such as usedBy, a "target data model" field for specifying data models that become targets of the relationship, and a "description" field indicating an explanation of the relationship.

Figure 2C:
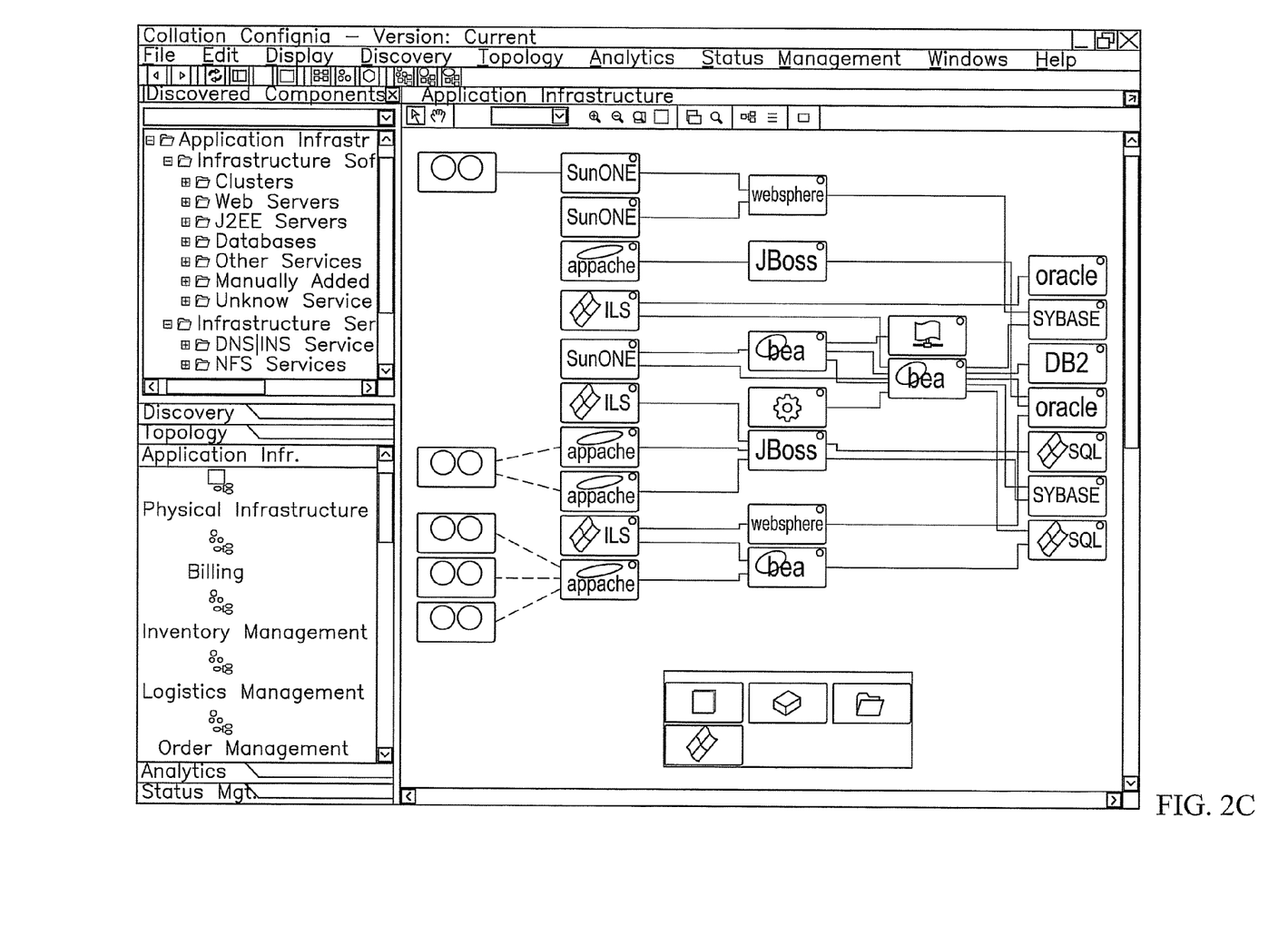
FIG. 2C shows an example of a screen indicating configuration information management in a CMDB.

FIG. 2C shows an example of a screen indicating the configuration information management in the CMDB. The screen is displayed using a graphical user interface (GUI). For example, the display may be created using TADDM. In FIG. 2C, the configuration item is an application. The relationships between applications are shown using solid lines. The names of the applications displayed on the screen are illustrative only.

Figure 3:
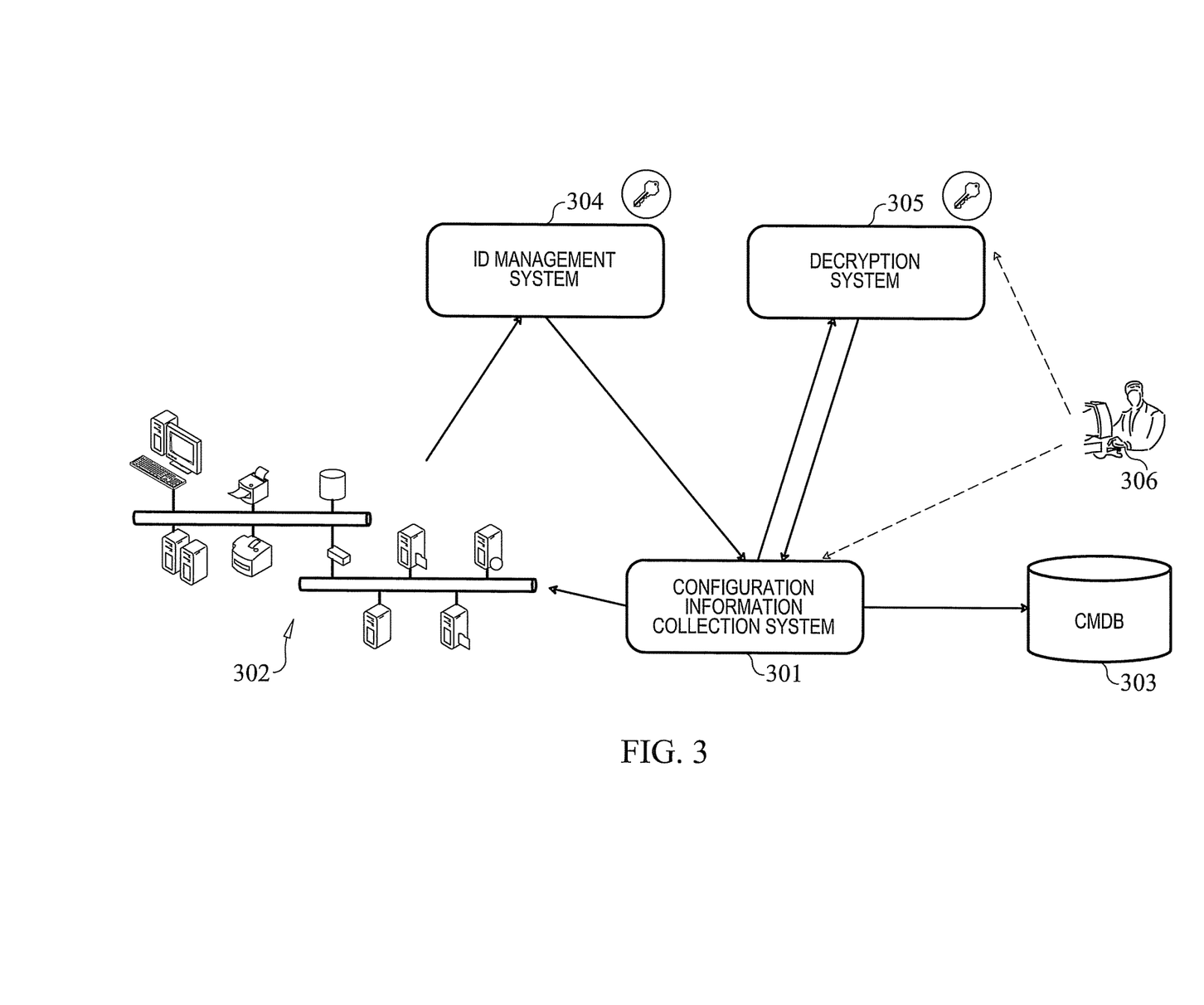
FIG. 3 shows a configuration diagram illustrating password management according to one embodiment.

FIG. 3 shows a configuration diagram showing password management according to a particular embodiment. FIG. 3 shows a configuration information collection system 301, configuration items 302, a CMDB 303, an ID management system 304, and a decryption system 305.

The configuration information collection system 301 corresponds to the computer system 100 shown in FIG. 1A and detects information on the configuration items 302 that are subject to management. The detection is performed by a discovery unit (corresponding to 101 in FIG. 1A). For example, the detection is performed according to a schedule set by the administrator of the configuration information collection system 301. For example, the administrator may set a schedule such that the detection is performed periodically.

The configuration information collection system 301 is connected to the configuration items 302 via a cable or network. For example, the configuration information collection system 301 may identify a particular one of the configuration items 302 using the IP address or MAC address of the particular configuration item 302. The configuration items 302 are resources that are subject to configuration management. The configuration items 302 can be, for example, servers, clients, an operating system (OS), middleware (e.g. web application (Web/AP), database management system (DBMS), lightweight directory access protocol (LDAP), etc.), package software, a management tool, a network device, or a storage device, or other device or software.

In order to detect information on the configuration items 302, the configuration information collection system 301 uses the respective IDs and passwords concerning the configuration items 302. The configuration items 302 each verify and authenticate an ID and a password from the configuration information collection system 301. Note that in some embodiments, when the configuration information collection system 301 attempts to detect information on the configuration items 302, not all the configuration items 302 request an ID and a password from the configuration information collection system 301. The ID is the ID with administrative authority over a particular one of the configuration items 302 and is used to access that configuration item 302. The password is a password corresponding to the ID. The ID and password may be changed by the administrator of each of the configuration items 302.

The configuration information collection system 301 is connected to a repository such as the CMDB 303 via a cable or a network. The configuration information collection system 301 may identify the CMDB 303, for example, by the IP address or MAC address of the CMDB 303. The repository may be a part of the configuration information collection system 301. The CMDB 303 is a database for recording at least one predetermined attribute of each configuration item 302 and relationships between each configuration item 302 and other configuration items. As will be described later, the CMDB 303 may also store an ID concerning each configuration item and an encrypted password corresponding to the ID. In this case, when the password concerning any configuration item is changed from a prior password, the CMDB 303 stores the encrypted, changed password. The ID may be encrypted or unencrypted, but the password stored at the CMDB is encrypted.

The configuration information collection system 301 may be connected to the ID management system 304 via a network. The configuration information collection system 301 may identify the ID management system 304, for example, by the IP address or MAC address of the ID management system 304. Similarly, the ID management system 304 may identify the configuration information collection system 301, for example, by the IP address or MAC address of the configuration information collection system 301.

The ID management system 304 manages the IDs concerning the configuration items 302 and the passwords corresponding to the IDs in a unified way. The ID management system 304 encrypts the password of each configuration item 302 using an encryption key, e.g., a public key of a decryption system 305. Therefore, the encrypted password cannot be decrypted unless a decryption key, e.g., a secret key of the decryption system 305, is used. The ID management system 304 stores the above-described ID and encrypted password in a storage unit of the ID management system 304 or a storage unit connected to the ID management system 304. The ID management system 304 does not store an unencrypted password, (i.e., a plaintext password) in the above-described storage units.

The administrator of each configuration item 302 may change the password. Therefore, if the password concerning any configuration item 302 is changed, the ID management system 304 receives the changed password from the configuration item 302 and, as described above, encrypts the password using a decryption key, e.g., a public key of the decryption system 305. Thus, the ID management system 304 may be enabled to manage the password concerning each configuration item 302 in synchronization. The ID management system 304 transmits an encrypted password or a changed, encrypted password to the configuration information collection system 301. For example, the ID management system 304 may be the Tivoli Identity Manager (TIM). If the password corresponding to the ID of the administrator of a configuration item is changed, the ID management system 304 is enabled to set the changed password for another configuration item using the same user ID.

The configuration information collection system 301 may be connected to the decryption system 305 via a network. For example, the configuration information collection system 301 may identify the decryption system 305 by the IP address or MAC address of the decryption system 305. Similarly, the decryption system 305 may identify the configuration information collection system 301, for example, by the IP address or MAC address of the configuration information collection system 301. The decryption system 305 transmits its own public key to the ID management system 304. Also, the decryption system 305 receives an encrypted password sent from the configuration information collection system 301 and decrypts the encrypted password using its own secret key. The decryption system 305 transmits the decrypted password to the configuration information collection system 301.

The decryption system 305 does not always run a decryption function to decrypt an encrypted password. For example, the decryption function may be configured to run at the time when the configuration information collection system 301 performs discovery. The administrator may schedule the execution of the decryption function. Also, for example, the decryption function may be set so that its execution is stopped when the configuration information collection system 301 detects information on the target configuration item 302. The detection of the information refers to, for example, detecting that the configuration information collection system 301 has received the information.

Figure 4:
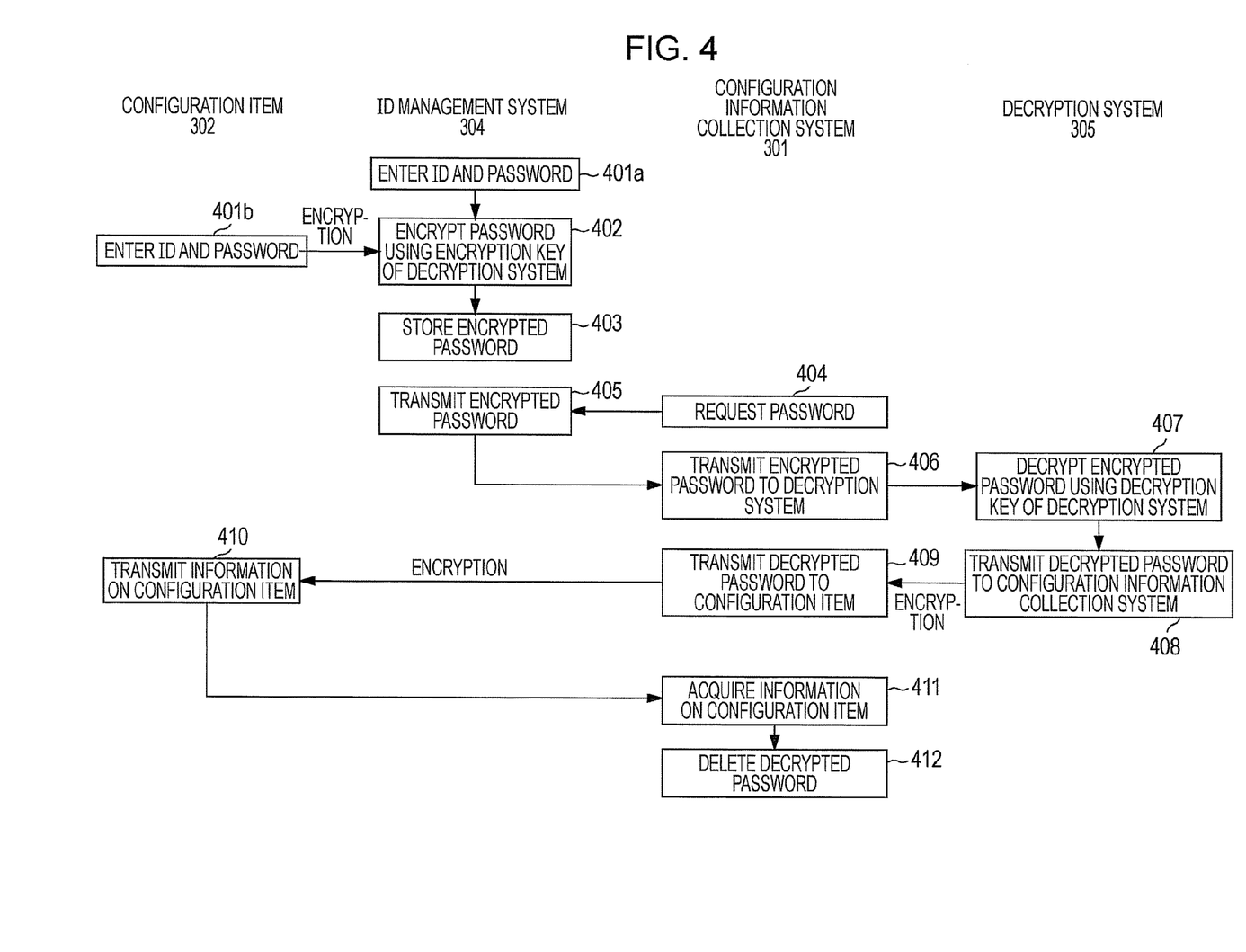
FIG. 4 is a diagram showing a flow of password management according to one embodiment.

FIG. 4 is a diagram showing a flow of password management according to a particular illustrative embodiment. The administrator of the ID management system 304 calls a management console on a display unit connected to the ID management system 304. Alternatively, the administrator of a particular one of the configuration items 302 calls a management console on a display unit connected to the particular configuration item 302. For example, the management console is displayed on a window using a browser. The window display has an entry field for setting the ID of the administrator having the authority to administer the particular configuration item 302 that is a subject of management and the password corresponding to the ID.

The administrator of the ID management system 304 for the particular configuration item 302 enters an ID and a password that he or she wants to set, in the entry field (401a and 401b). In the latter case (401b), the configuration item 302 transmits the entered ID and password to the ID management system 304, for example, via a network. In order to assure the security during the transmission, the entered ID and password is transmitted to the ID management system 304 using a protocol for sending or receiving information in an encrypted state on a network. An example of the protocol is SSL (Secure Socket Layer). Alternatively, the entered ID and password is encrypted using an encryption key, e.g., a public key of the ID management system 304. Upon receipt of the encrypted ID and password, the ID management system 304 decrypts the ID and password using its own decryption key, e.g., a secret key.

Then, the ID management system 304 encrypts the above-described ID and password using an encryption key, e.g., a public key of the decryption system 305 to be described below (402). Therefore, the encrypted password cannot be decrypted unless a decryption key, e.g., a secret key of the decryption system 305 is used. Then, the ID management system 304 stores the encrypted ID and password in a storage unit of the ID management system 304 or in a storage unit connected to the ID management system 304 (403). Once the ID management system 304 has encrypted the password, it deletes the plaintext password from a storage unit thereof, e.g., a cache memory. Therefore, the ID management system 304 stores the encrypted password but does not retain the unencrypted password.

Subsequently, the ID management system 304 transmits the encrypted ID and password to the configuration information collection system 301 (405). In this embodiment, the configuration information collection system 301 need not request the password of the ID management system 304. Alternatively, in order to collect information on a configuration item, the configuration information collection system 301 requests the password concerning the configuration item of the ID management system 304 (404). For example, the encrypted password may be requested by issuing a command to the transmission unit. In response to the request, the ID management system 304 reads an encrypted password from a storage unit and transmits the encrypted password to the configuration information collection system 301 (405). Even if the encrypted password is stolen during the transmission, the encrypted password cannot be decrypted unless a decryption key of the decryption system 305 is obtained.

The configuration information collection system 301 stores the encrypted password from the ID management system 304 in a storage unit thereof (301) or the CMDB 303. In order to decrypt the received encrypted password, the configuration information collection system 301 transmits the encrypted password to the decryption system 305 (406). Even if the encrypted password is stolen during the transmission, the encrypted password cannot be decrypted unless a decryption key of the decryption system 305 is obtained.

The decryption system 305 receives the encrypted password from the configuration information collection system 301 and decrypts the encrypted password using a decryption key of the decryption system 305 (407). The decryption function of the decryption system 305 may be set to run at the time when the configuration information collection system 301 performs discovery. Then, the decryption system 305 transmits the decrypted password to the configuration information collection system 301 (408). In order to assure the security during the transmission, the decrypted password is sent to the configuration information collection system 301 using a protocol for sending or receiving information in an encrypted state on a network. An example of the protocol is SSL. Alternatively, the decrypted password is encrypted using an encryption key, e.g., a public key of the configuration information collection system 301. In a particular embodiment, the decryption function of the decryption system 305 is stopped by transmitting a command to the decryption system 305 to stop the decryption function.

If the configuration information collection system 301 receives the above-described decrypted password in a state encrypted using an encryption key of the configuration information collection system 301, the configuration information collection system 301 decrypts the password using its own decryption key, for example, a secret key. Then, the configuration information collection system 301 temporarily stores the decrypted password in a storage unit, e.g., a cache memory. The configuration information collection system 301 transmits the ID corresponding to the above-described configuration item 302 and the decrypted password corresponding to the ID to the configuration item 302 (409). In this case, the configuration information collection system 301 transmits the ID and the decrypted password using a method acceptable to the configuration item 302.

Alternatively, if the configuration item 302 supports a protocol for sending or receiving information in an encrypted state on a network, the configuration information collection system 301 transmits the decrypted password to the configuration item 302 using a protocol in order to assure security during transmission. An example of the secure protocol is SSL.

Alternatively, if the configuration item 302 previously distributes a public key of its own to the configuration information collection system 301, the configuration information collection system 301 encrypts the decrypted password using the encryption key, e.g., a public key of the configuration item 302. In this embodiment, the decrypted password may exist in plain text in the configuration information collection system 301. However, upon receipt of information on the configuration item 302, the configuration information collection system 301 deletes the decrypted password from the configuration information collection system 301 so as not to leak the decrypted password (412).

In some embodiments, it is preferable that each time the configuration information collection system 301 transmits the decrypted password to the configuration item 302, it deletes the decrypted password. However, if the decrypted password is sent again at an interval such that the decrypted password is not leaked, the configuration information collection system 301 does not need to delete the decrypted password each time it transmits the decrypted password to the configuration item 302. For example, the configuration information collection system 301 may delete the decrypted password after the configuration information collection system 301 transmits the decrypted password to the configuration item 302 a predetermined number of times or after a predetermined time period has elapsed.

If the configuration item 302 receives the decrypted password in an encrypted state using the encryption key of the configuration item 302, the configuration item 302 decrypts the decrypted password using a decryption key, e.g., a secret key of its own. Then, the configuration item 302 verifies the ID and password from the configuration information collection system 301. If the configuration item 302 authenticates the ID and password, it transmits information about itself (302), (i.e. information on the configuration item 302), to the configuration information collection system 301 (410). When the information on the configuration item 302 is transmitted on a network, it may be encrypted or unencrypted.

Upon receipt of information on the configuration item 302, the configuration information collection system 301 passes the information on to the CI reconciliation apparatus (102 in FIG. 1A). The method for storing the information in the CMDB is as described with reference to FIG. 1A. Also, upon receipt of the information on the configuration item 302 (411), the configuration information collection system 301 deletes the decrypted password from the cache memory (412).

Figure 5:
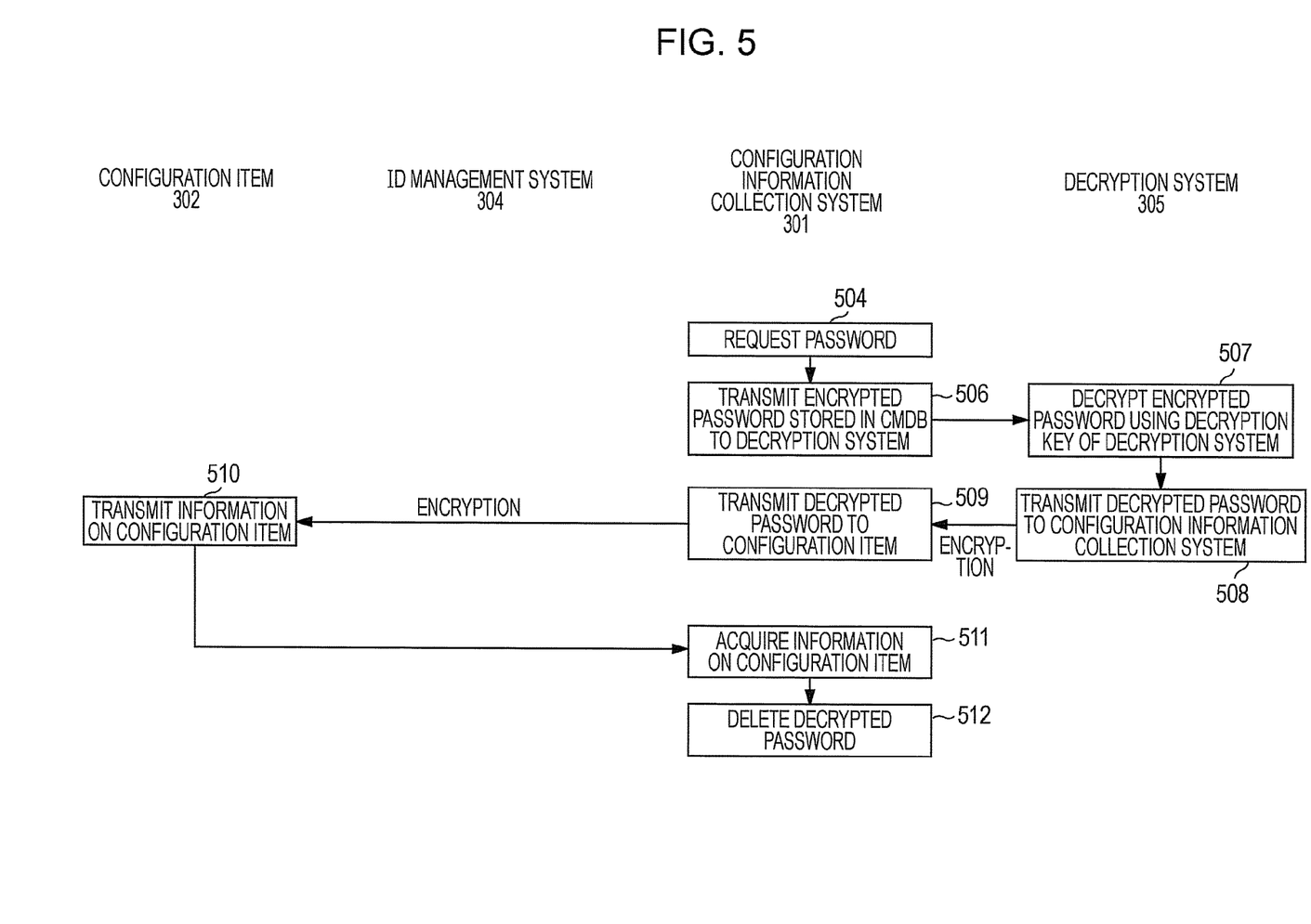
FIG. 5 is a diagram showing a flow of password management according to a particular embodiment when the encrypted password concerning a configuration item is stored in a CMDB.

FIG. 5 shows a diagram illustrating a flow of password management according to a particular embodiment where the encrypted password concerning the configuration item 302 is already stored in the CMDB (303 in FIG. 3). The configuration information collection system 301 has already received the encrypted password from the ID management system 304 and stores the encrypted password in the CMDB (303 in FIG. 3).

In order to collect information on a configuration item, the configuration information collection system 301 requests the password concerning the configuration item of the CMDB (504). Then, the configuration information collection system 301 checks whether the password concerning the configuration item is stored in the CMDB (303 in FIG. 3). If the configuration information collection system 301 confirms that the password concerning the configuration item is stored, it retrieves the encrypted password from the CMDB (303 in FIG. 3). The configuration information collection system 301 transmits the encrypted password to the decryption system 305 (506).

Steps 507 to 512 correspond to steps 407 to 412 in FIG. 4, respectively.

Figure 6:
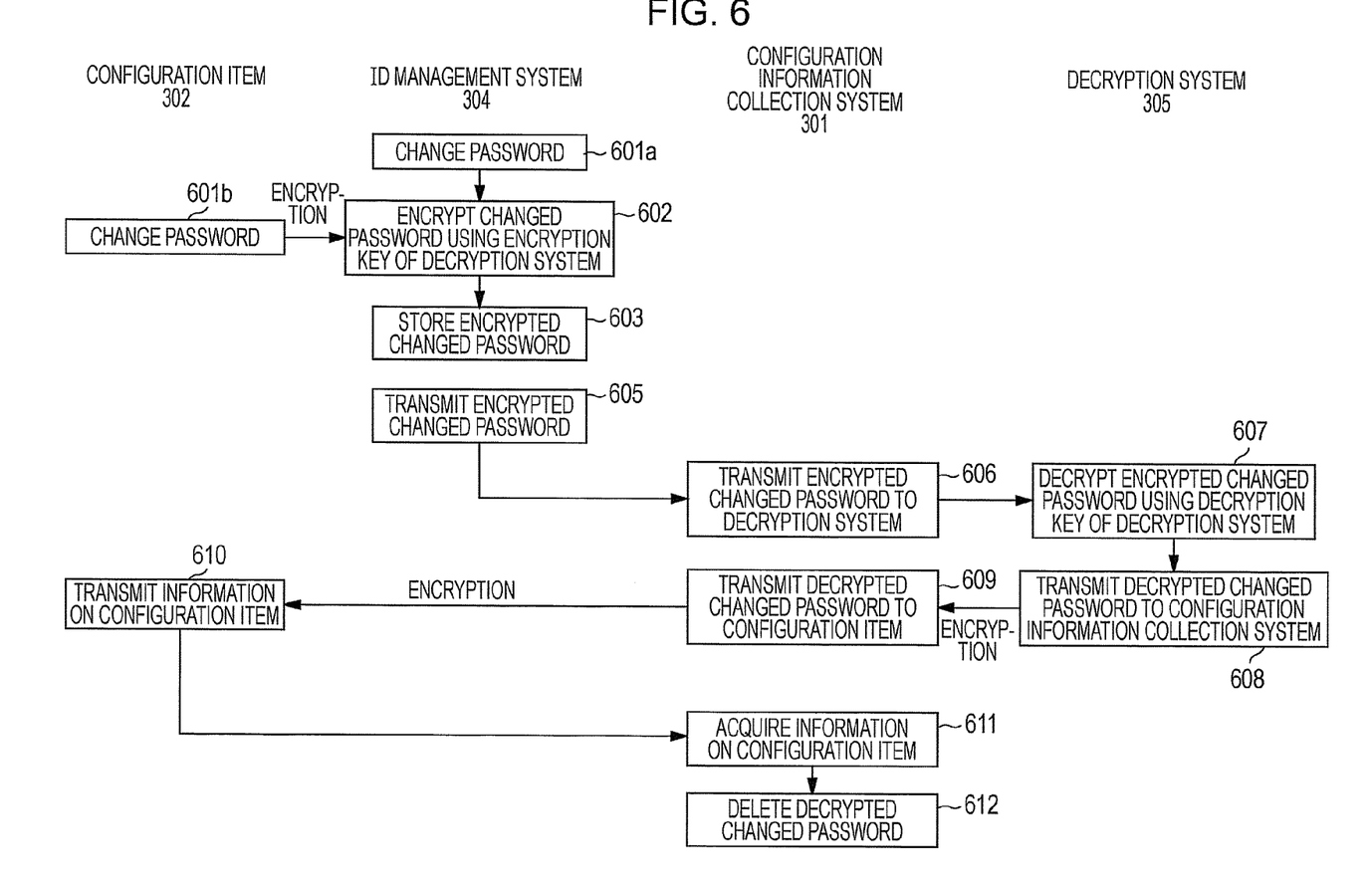
FIG. 6 is a diagram showing a flow of password management according to a particular embodiment when a password concerning one of the configuration items is changed.

FIG. 6 shows a diagram illustrating a flow of password management according to an embodiment when the password concerning one of the configuration items 302 is changed. The administrator of the ID management system 304 calls a management console on a display unit connected to the ID management system 304. Alternatively, the administrator of a particular one of the configuration items 302 calls a management console of the ID management system 304 on a display unit connected to the particular configuration item 302. Then, the administrator of the ID management system 304 (or the particular configuration item 302) provides a password desired table changed in the entry field (601*a* and 601*b*). In the latter case (601*b*), the configuration item 302 transmits the changed password to the ID management system 304, for example, via a network.

The ID management system 304 encrypts the changed password using an encryption key, e.g., a public key of the decryption system 305 (602). The encrypted, changed password cannot be decrypted unless a decryption key, e.g., a secret key of the decryption system 305 is used. Then, the ID management system 304 stores the encrypted, changed password in a storage unit of the ID management system 304 or a storage unit connected to the ID management system 304 (603). The ID management system 304 transmits the encrypted, changed password to the configuration information collection system 301 (605). The configuration information collection system 301 stores the encrypted, changed password from the ID management system 304 in a storage unit, for example, the CMDB (303 in FIG. 3). Steps 606 to 612 correspond to steps 406 to 412 in FIG. 4, respectively.

The password concerning the particular configuration item 302 is encrypted except during a temporary period during which the decrypted password from the decryption system 305 is received by the configuration information collection system 301. Further, none of the encryption keys or the decryption keys exist in the configuration information collection system 301. Therefore, the security management of the configuration information collection system 301 need not be made more stringent.

In one embodiment, the ID management system 304 manages the password concerning each configuration item 302 in synchronization. Therefore, the effort of the configuration information collection system 301 for managing the password in synchronization is reduced. Further, the ID management system 304 need not store plaintext passwords.

In one embodiment, even if the encrypted password concerning the particular configuration item 302 is illegally acquired by a third party, the third party cannot decrypt the encrypted password concerning the configuration item 302 unless the third party determines the timing when the decryption function of the decryption system 305 is made available and unless the third party spoofs the decryption function.

Computers used as the configuration information collection system 301, the ID management system 304, and the decryption system 305 according to this embodiment each include a central processing unit (CPU) and a main memory that are connected to a bus. The CPU is preferably on the basis of an architecture of 32 bits or 64 bits and may be, for example, the Xeon™ series, Core™ series, Pentium™ series, or Celeron™ series manufactured by the Intel Corporation, the Phenom™ series and Athlon™ series manufactured by AMD Corporation, or the like. A display such as an LCD monitor is connected to the bus via a display controller. The display is used to display information on a computer connected to a network via a communication line and information on software running on the computer using an appropriate graphic interface in order to manage a computer system.

Also, a hard disk or a silicon disk drive and a compact disc-read only memory (CD-ROM) drive, a digital versatile disc (DVD) drive, or a Blu-ray disc (BD) drive are connected to the bus via an integrated device electronics (IDE) or a serial advanced technology attachment (SATA) controller. The hard disk stores an operating system, a program for providing a Java processing environment such as J2EE, an operation management program for CMDB, and other programs and data in such a manner that these items of software are loadable to the main memory. The operation management program preferably includes the TADDM (Tivoli Application Dependency Discovery Manager) provided by IBM. The CD-ROM drive, DVD drive, or BD drive is used to additionally install a program from a CD-ROM, a DVD, or a BD to the hard disk as necessary. Also, a keyboard and a mouse are connected to the bus via a keyboard/mouse controller.

The communication interface is, for example, in conformity with the Ethernet protocol and is connected to the bus via a communication controller. The communication interface plays a role of physically connecting the computer and communication line and provides the network interface layer to the transmission control protocol/Internet protocol (TCP/IP) communication protocol of the communication function of the operating system of the computer. The communication line may be a wired LAN environment or a wireless local area network (LAN) environment in conformity with a wireless connection standard such as the IEEE 802.11a, 802.11b, 802.11g, or 802.11n standards.

Network connection apparatuses may be used to connect pieces of hardware such as computers. Examples of network connection apparatuses are a router and a hardware management console as well as the above-described network switch. In short, any network connection apparatus is applicable as long as it has a function of, in response to an inquiry from a computer including a network operation management program according to a predetermined command, sending back information such as the IP address or MAC address of a computer connected to the former computer. A network switch and a router both include an address resolution protocol (ARP) table including a list of a pair of the IP address of a computer connected to the network switch or router and the MAC address corresponding to the IP address and have a function of sending back the contents of the ARP table in response to an inquiry according to a predetermined command. A hardware management console is allowed to send back configuration information on a computer that is more detailed than an ARP table.

Those of skill would further appreciate that the various illustrative logical blocks, configurations, modules, circuits, and algorithm steps described in connection with the embodiments disclosed herein may be implemented as electronic hardware, computer software, or combinations of both. Various illustrative components, blocks, configurations, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

The steps of a method or algorithm described in connection with the embodiments disclosed herein may be embodied directly in hardware, in a software module executed by a processor, or in a combination of the two. A software module may reside in random access memory (RAM), flash memory, read-only memory (ROM), programmable read-only memory (PROM), erasable programmable read-only memory (EPROM), electrically erasable programmable read-only memory (EEPROM), registers, hard disk, a removable disk, a compact disc read-only memory (CD-ROM), or any other form of storage medium known in the art. An exemplary storage medium is coupled to the processor such that the processor can read information from, and write information to, the storage medium. In the alternative, the storage medium may be integral to the processor. The processor and the storage medium may reside in an application-specific integrated circuit (ASIC). The ASIC may reside in a computing device or a user terminal. In the alternative, the processor and the storage medium may reside as discrete components in a computing device or user terminal.

The previous description of the disclosed embodiments is provided to enable any person skilled in the art to make or use the disclosed embodiments. Various modifications to these embodiments will be readily apparent to those skilled in the art, and the principles defined herein may be applied to other embodiments without departing from the scope of the disclosure. The present disclosure is not intended to be limited to the embodiments shown herein but is to be accorded the widest scope possible consistent with the principles and novel features as defined by the following claims.

What is claimed is:

1. A method, comprising:
   requesting, by a configuration information collection system, a password corresponding to a first configuration item of a plurality of configuration items from an identity (ID) management system based on an indication to detect information for the first configuration item;
   receiving, at the configuration information collection system, an encrypted password from the ID management system for the first configuration item in response to the request for the password corresponding to the first configuration item;
   transmitting, by the configuration information collection system, the encrypted password to a decryption system;
   receiving, at the configuration information collection system, a decrypted password from the decryption system;

storing, at the configuration information collection system, the decrypted password;

transmitting, by the configuration information collection system, the decrypted password to the first configuration item for the information;

receiving, at the configuration information collection system, the infoimation from the first configuration item;

removing, from the configuration information collection system, the decrypted password in response to receiving the information from the first configuration item;

determining, by the configuration information collection system, whether the information from the first configuration item relates to a new configuration item or to an existing configuration item by comparing at least a portion of the information from the first configuration item and data in a configuration management database; and initiating modification of the configuration management database with the information from the first configuration item according to the determination.

2. The method of claim 1, further comprising creating a set of data that indicates at least one attribute of the first configuration item as well as indicates at least one relationship between the first configuration item and at least one other configuration item in response to determining that the information from the first configuration item relates to the new configuration item.

3. The method of claim 2, wherein the set of data is created according to a data model, a relationship model, or any combination thereof.

4. The method of claim 2, wherein initiating modification of the configuration management database includes storing the set of data in the configuration management database.

5. The method of clam 4, wherein the set of data is stored in the configuration management database as a configuration item instance.

6. The method of claim 5, wherein the set of data is stored as the configuration item instance in the configuration management database by:

storing the at least one attribute and the at least one relationship from the set of data in the configuration item instance, or storing the at least one attribute in the configuration item instance and storing the at least one relationship in a relationship instance that is distinct from the configuration item instance.

7. The method of claim 1, further comprising:

receiving, at the configuration information collection system, an ID corresponding to the first configuration item from the ID management system; and transmitting, by the configuration information collection system, the ID to the first configuration item for the information.

8. The method of claim 1, wherein the indication to detect information for the first configuration item includes input from an administrator, schedule information, a detection range, or any combination thereof.

9. The method of claim 8, wherein the detection range includes a domain name, an Internet protocol address, a media access control address, an identifier of an apparatus, a name of a database, or any combination thereof.

10. The method of claim 1, wherein the encrypted password received from the ID management system for the first configuration item is an encrypted changed password for the first configuration item.

11. The method of claim 1, wherein the data in the configuration management database for the comparison includes a name of at least one instance of a configuration item stored in the configuration management database.

12. The method of claim 1, wherein initiating modification of the configuration management database includes updating the configuration management database with at least one attribute of the first configuration item, at least one relationship of the first configuration item and another configuration item, or any combination thereof in response to determining that the information from the first configuration item relates to the existing configuration item.

13. The method of claim 12, wherein the configuration management database is updated by updating the at least one attribute of the first configuration item, the at least one relationship of the first configuration item and the other configuration item, or any combination thereof in a configuration item instance of the first configuration item in the configuration management database.

14. A system, comprising:

a configuration management database; and a configuration information collection system coupled to the configuration management database and configured to:

request a password corresponding to a first configuration item of a plurality of configuration items from an identity (ID) management system based on an indication to detect information for the first configuration item;

receive an encrypted password from the ID management system for the first configuration item in response to the request for the password corresponding to the first configuration item;

transmit the encrypted password to a decryption system;

receive a decrypted password from the decryption system;

store the decrypted password;

transmit the decrypted password to the first configuration item for the information;

receive the information from the first configuration item;

remove the decrypted password in response to receiving the information from the first configuration item;

determine whether the information from the first configuration item relates to a new configuration item or to an existing configuration item by comparing at least a portion of the information from the first configuration item and data in the configuration management database; and initiate modification of the configuration management database with the information from the first configuration item according to the determination.

15. The system of claim 14, wherein the configuration information collection system is further configured to:

create a set of data that indicates at least one attribute of the first configuration item and indicates at least one relationship between the first configuration item and at least one other configuration item in response to determining that the information from the first configuration item relates to the new configuration item;

wherein initiating modification of the configuration management database includes storing the set of data in the configuration management database as a configuration item instance in the configuration management database.

16. The system of claim 14, wherein the configuration information collection system is further configured to:

receive an ID corresponding to the first configuration item from the ID management system; and transmit the ID to the first configuration item for the information.

17. The system of claim 14, wherein the indication to detect the information for the first configuration item includes input from an administrator, schedule information, a detection range, or any combination thereof, and wherein the detection range includes a domain name, an Internet protocol address, a media access control address, an identifier of an apparatus, a name of a database, or any combination thereof.

18. The system of claim 14, wherein the encrypted password received from the ID management system for the first configuration item is an encrypted changed password for the first configuration item.

19. The system of claim 14, wherein the data in the configuration management database for the comparison includes a name of at least one instance of a configuration item stored in the configuration management database.

20. The system of claim 14, wherein the configuration information collection system is further configured to update the configuration management database with at least one attribute of the first configuration item, at least one relationship of the first configuration item and another configuration item, or any combination thereof in response to determining that the information from the first configuration item relates to the existing configuration item.

* * * * *